(12) United States Patent
Byron

(10) Patent No.: US 7,499,251 B2
(45) Date of Patent: Mar. 3, 2009

(54) ARCING FAULT PROTECTION SYSTEM FOR AN AIR ARC SWITCHGEAR ENCLOSURE

(76) Inventor: Eldridge R Byron, 1730 Somerset Dr., Murfreesboro, TN (US) 37129

( * ) Notice: Subject to any disclaimer, the term of this patent is extended or adjusted under 35 U.S.C. 154(b) by 135 days.

(21) Appl. No.: 11/652,303

(22) Filed: Jan. 11, 2007

(65) Prior Publication Data

US 2008/0170344 A1    Jul. 17, 2008

(51) Int. Cl.
*H02H 3/00* (2006.01)
*H02H 1/00* (2006.01)

(52) U.S. Cl. ......................................................... 361/42
(58) Field of Classification Search .................... 361/42
See application file for complete search history.

(56) References Cited

U.S. PATENT DOCUMENTS

| | | | |
|---|---|---|---|
| 4,369,364 A | 1/1983 | Kuntermann | 250/227 |
| 5,682,101 A | 10/1997 | Brooks et al. | 324/536 |
| 5,933,308 A | 8/1999 | Garzon | 361/62 |
| 6,141,192 A * | 10/2000 | Garzon | 361/5 |
| 2004/0027748 A1* | 2/2004 | Kojovic et al. | 361/62 |

* cited by examiner

*Primary Examiner*—Ronald W Leja

(57) ABSTRACT

An arcing fault protection system for a switchgear enclosure includes an arc diverter for rapidly grounding or crow-barring the electrical distribution system in response to the detection of arcing fault currents in the system. Detection is done through a comparison of current on the main bus against the current through the feeder lines, whereby a difference in current gives a first detection signal. The first detection signal can be used directly, or AND'ed with other detection signals from optical sensors on the feeder lines, to provide the activation signal for operating the arc diverter.

6 Claims, 2 Drawing Sheets

ARCING FAULT PROTECTION SYSTEM FOR AN AIR ARC SWITCHGEAR ENCLOSURE

BACKGROUND OF THE INVENTION

1. Field of the Invention

The present invention relates generally to protective devices for electrical switchgear and, more particularly, to the protection of electrical switchgear from arcing fault currents.

2. Discussion of the Related Art

Switchgear enclosures are commonly employed in electrical power distribution systems for enclosing circuit interrupters and switching equipment associated with the distribution system. Typically, switchgear enclosures are comprised of a number of individual stacked or adjacent compartments, each of the switchgear compartments receiving electrical power from a power source and distributing the electrical power through a feeder circuit to one or more loads. Generally, each of the switchgear compartments includes circuit interrupters for breaking electric power in a particular feeder circuit in response to hazardous current overloads in the circuit, or normal switching events.

In addition to current overloads, the switchgear enclosure may encounter other hazardous conditions known as arcing faults. Arcing faults occur when electric current "arcs" or flows through ionized gas between conductors, e.g., between two ends of broken or damaged conductors, or between a conductor and ground in the switchgear enclosure. Arcing faults typically result from corroded, worn or aged wiring or insulation, loose connections and electrical stress caused by repeated overloading, lightning strikes, etc. Particularly in medium- to high-voltage power distribution systems, the ionized gas associated with arcing faults may be released at pressures and temperatures sufficient to severely damage or destroy the switchgear equipment and/or cause severe burning injuries or death to operating personnel.

Switchgear enclosures generally provide arc-resistant metal switchgear compartments, often with a means for venting the gases from the compartments in the event of an arcing fault. These compartments are designed to withstand the pressures and temperatures of the gases associated with an arcing fault and reduce the likelihood or extent of damage to switchgear equipment by preventing the gases from entering adjacent switchgear compartments. Safety to operating personnel is enhanced by channeling and venting the hot gases away from operating personnel. However, because these systems do not eliminate the generation and release of hot gases associated with arcing faults, they do not completely eliminate the risk of injury to operating personnel and/or damage to the switchgear equipment.

Therefore, one commonly employed method for enhancing the safety and durability of switchgear enclosures in the event of arcing faults, as described in U.S. Pat. No. 5,933,308 to Garzon, is to provide arc-resistant metal switchgear compartments with a means for grounding or shunting the source bus current in the event of an arcing fault condition. This is done in Garzon by monitoring the rise rate of the source or main bus current and monitoring the light produced by arcing events in each feeder compartment by optical sensors. The current and the optical signals are AND'ed together to produce an arcing fault detection signal which activates an arc diverter mechanism within the appropriate time frame. Other known arcing fault sensing circuits use only optical detectors.

ANSI/IEEE standard C37.20.7 is currently being revised to include low voltage (LV) power switchgear C37.20.1 construction and metal enclosed C37.20.3 construction. The current design of the known arcing fault protectors cannot be used in these low voltage constructions.

In known arc diverter systems using a combination of optical detectors and current sensing, the harmonics on the main line, especially the third harmonic, rise at a rate fast enough to create a positive signal on the current sensor a majority of the time. This leaves the optical arc sensors on the feeder lines as the major determinant. However, low voltage applications commonly have an open air switching and circuit breakers, rather than the vacuum systems of most modern Medium Voltage (MV) switching and breakers. Therefore, in these LV systems detectable light from arcs can be created anytime a switching action or break occurs. Most LV breakers and some older Medium Voltage breakers are open air. Therefore an optical sensor cannot be relied on since the arc diverter would consistently be activated with both current and optical detectors AND'ing together almost every time a switching or breaking event occurs, rather than only when a true arcing fault condition occurs. Therefore, another approach is needed. The present invention is directed to addressing this need.

SUMMARY OF THE INVENTION

The present invention utilizes current sensors on both the main and the feeder branches. The current sensor outputs are compared in a manner that the result of the comparison, e.g., the output of a comparator, is zero under normal circumstances and only presents a value to the arcing fault detector when there is a problem, i.e., the main bus current is not equal to feeder current, thereby indicating an arcing fault condition. In some embodiments optical sensors may still be used in the feeder circuits to be AND'ed with the current summation signal. While the light sensors may be activated by an open air switch or circuit breaker, if no arcing fault condition is occurring the current sensor will be neutral and the arcing fault detector will not operate the arc diverter mechanism.

In accordance with one aspect of the present invention, there is provided an arcing fault protection system for a switchgear enclosure accommodating a plurality of feeder circuits. Each of the feeder circuits is electrically connected to a source bus and carries an electric current through the switchgear enclosure toward one or more loads downstream of the switchgear enclosure. The arcing fault protection system comprises a plurality of arcing fault detectors for monitoring the feeder circuits for the presence of arcing fault currents, means for producing an arcing fault detection signal upon detecting arcing fault currents in any of the feeder circuits, and an arc diverter mechanism such as a grounding device for rapidly grounding the source bus in response to the production of an arcing fault detection signal. The grounding of the source bus diverts current carried on the source bus to ground and rapidly eliminates arcing fault currents occurring on any of the feeder circuits. The rapid elimination of arcing fault currents substantially reduces or eliminates the generation of hot gases associated with arcing faults and reduces the need to provide an arc-resistant switchgear enclosure or to vent gases from the enclosure.

In accordance with others aspect of the present invention, the arc diverter may comprise a mechanical switch rapidly movable from an open position to a closed position in response to activation of a triggering mechanism or may comprise solid state devices connected from the source bus to ground permitting current flow to ground when the arcing fault detection signal is applied.

BRIEF DESCRIPTION OF THE DRAWINGS

In the drawings, which comprise a portion of this disclosure.

DETAILED DESCRIPTION

Figure 1:
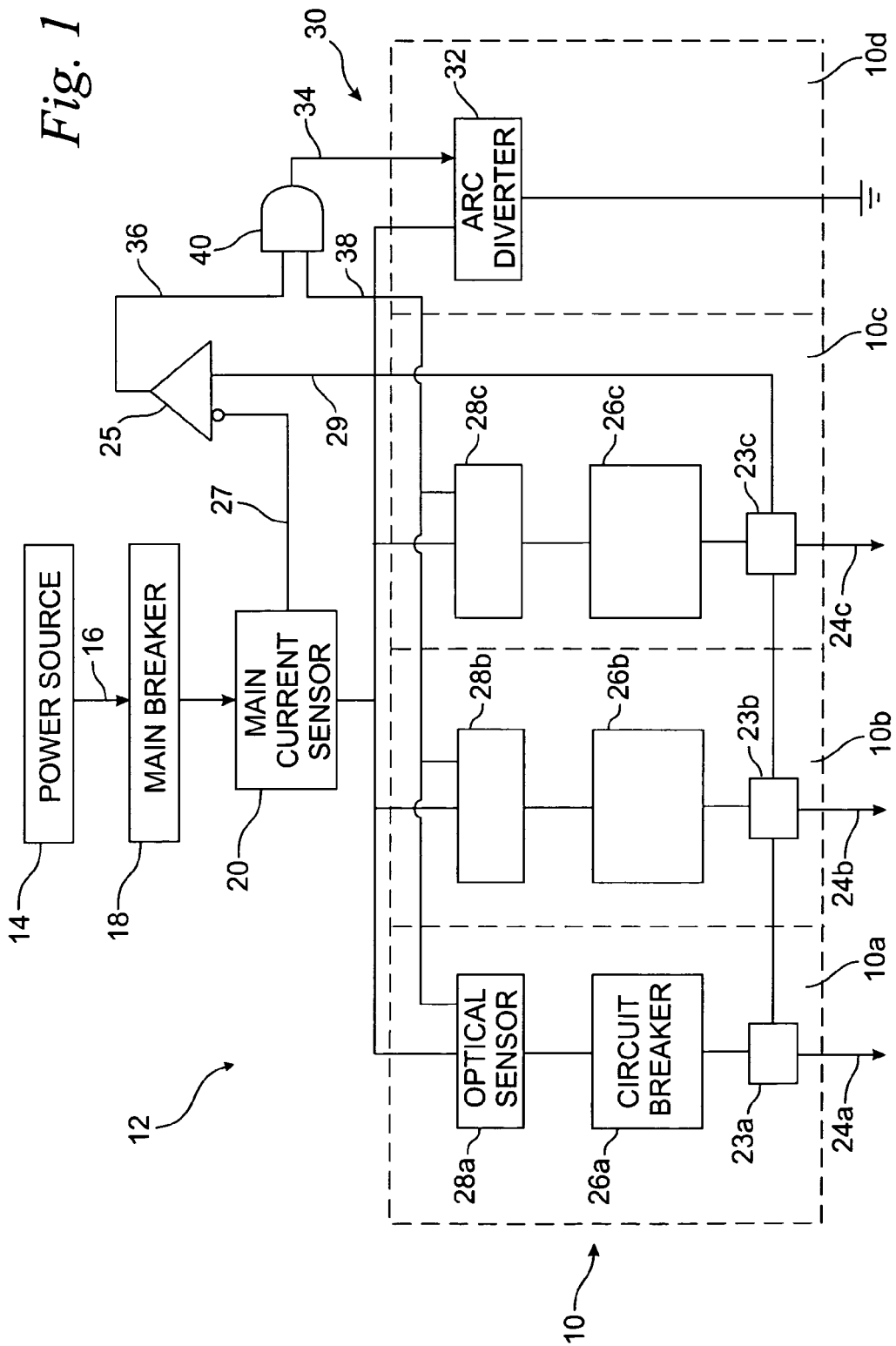
FIG. 1 is a block diagram of an arcing fault protection system for a switchgear enclosure according to one embodiment of the present invention.

Turning now to the drawings and referring first to FIG. 1, there is shown a switchgear enclosure, generally designated by reference numeral 10, including individual compartments 10a, 10b, 10c and 10d, collectively 10, for housing various components of an electrical distribution system 12. A power source 14, which may comprise, for example, a utility company power transformer, supplies power for the distribution system 12 through a main circuit 16. The main circuit 16 is typically routed through a main breaker, designated here by reference numeral 18. A main current sensor 20 such as a toroidal coil may also be provided for monitoring the main circuit 16 for characteristics of arcing faults, as is known in the art. A source bus 22 connected to the main circuit 16 distributes electrical power from the power source 14 to a plurality of feeder circuits 24a, 24b, 24c, each of which is routed through one of the switchgear compartments 10. Each of the feeder circuits, collectively 24, typically supplies power to one or more loads (not shown) downstream of the switchgear enclosure 10. It will be appreciated that the number of feeder circuits 24 shown here, as well as the number of switchgear compartments 10, is exemplary only, and may be varied according to the particular type and/or application of the switchgear enclosure 10.

The switchgear enclosure 10 typically includes switching and monitoring equipment associated with the respective feeder circuits 24. For example, in the embodiment shown in FIG. 1, the switchgear enclosure 10 includes a plurality of circuit interrupters, here shown as circuit breakers 26a,b,c and a plurality of optical sensors 28a,b,c distributed among the compartments. In one embodiment, the circuit breakers, collectively 26, and optical sensors, collectively 28, comprise devices known in the art which are mounted within the respective switchgear compartments 10a,b,c and are associated with one of the feeder circuits 24a,b,c. The circuit breakers 26 are provided for interrupting, i.e. breaking, electric power in the respective feeder circuits 24 in response to current overloads and the optical sensors 28 are provided for monitoring the respective feeder circuits 24 for the presence of light produced by arcing faults. Again, however, it will be appreciated that the electrical components shown here are exemplary only; they may be replaced, eliminated or supplemented with other components, according to the particular type and/or application of the switchgear enclosure.

In accordance with one aspect of the present invention, an arc diverter circuit 30 is connected between the source bus 22 and ground. In the case of an ungrounded (i.e., "delta") system (not shown), the arc diverter circuit 30 is connected between the phase lines of the system. The arc diverter circuit 30 includes an arc diverter 32 which, upon receipt of an arcing fault detection signal 34, quickly connects the source bus 22 to ground or "crow-bars," i.e., shorts the circuits to be protected, thereby extinguishing arcing fault currents which may have occurred on any of the feeder circuits 24 before they are permitted to generate gases at dangerous pressures and/or temperatures. In one embodiment, for example, the arcing fault currents are extinguished in less than about 4 milliseconds, effectively eliminating the generation of dangerous gases associated with the arcing fault. As will be understood by those in the art, the arc diverter 32 may comprise a mechanical switch, solid-state switch, or hybrid mechanical and solid-state switch. The arc diverter 32 may be mounted in one of the switchgear compartments, as shown here, or may be mounted in a separate compartment external to the switchgear enclosure 10.

Figure 2:
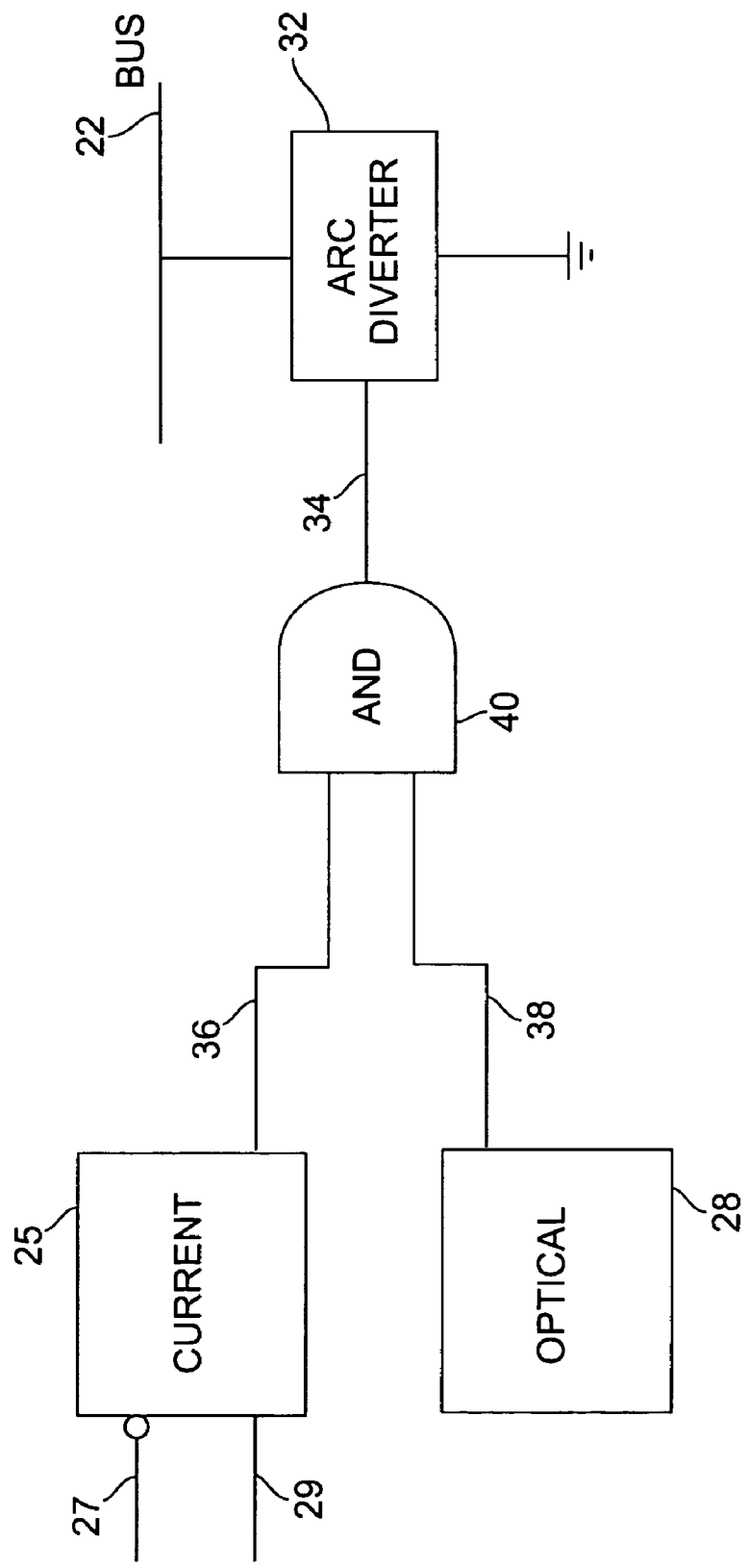
FIG. 2 is a block diagram illustrating a system which may be used to generate an arcing fault detection signal in the system of FIG. 1.

Also referencing FIG. 2, an embodiment is illustrated in which the arcing fault detection signal 34 is generated by a combination of the first or main current sensor 20 monitoring the current of the source bus 22; a plurality of second current sensors 23a,b,c, collectively 23, one for each feeder circuits 24, and optical sensors 28 monitoring the feeder circuits 24.

The current sensors 20 and 23 may comprise any type of current sensor known in the art. In one embodiment, the current sensors may comprise a coil for monitoring the rate of change of current in main circuit 16 and the feeder circuits 24. It is known that a coil wound around a current-carrying conductor produces a signal representative of the magnitude or rate of change of current that may be evaluated for characteristics of arcing faults. One such system is described, for example, in U.S. Pat. No. 5,682,101, to Brooks et al. The current senor outputs 27, 29 are fed to a comparator 25, illustrated here as an amplifier with one inverting input, for comparing the source bus current to the sum of the feeder circuits current and outputting a first arcing fault signal 36 indicative of a presence of arcing fault currents.

The optical sensors 28 may comprise any type of optical sensor known in the art such as, for example, the optical sensor described in U.S. Pat. No. 4,369,364. The optical sensors 28 are sensitive to light impulses representing the occurrence of arcing faults within the switchgear enclosure 10 and produce a second arcing fault detection signal 38, if they determine that an arcing fault is present on any of the feeder circuits 24.

In one embodiment, the respective arcing fault detection signals 36, 38 are fed to an arcing fault detector, such as an AND gate, 40 which produces a consolidated arcing fault detection signal 34 to trigger the arc diverter 32 only when arcing fault detection signals are provided by both the current sensor 20 and optical sensor 28. In this case the arc diverter 32 can be said to be indirectly responsive to the current sensors. This arrangement minimizes the chance that switching will occur due to "false" signals because it is unlikely that false signals will be detected by both the current sensor 20 and the optical sensor 28. It will be appreciated, however, that the arcing fault detection signal 34 may be generated by a system including only current sensors according to the present invention, whereby the arc diverter 32 can be said to be directly responsive to the current sensors.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit and scope of the invention as defined in the appended claims.

What is claimed is:

1. An arcing fault protection system for a plurality of feeder circuits, each of the feeder circuits being electrically connected to a source bus and carrying an electric current toward one or more downstream loads, the source bus being connected to a power source for carrying current from the power source to the feeder circuits, the arcing fault protection system comprising:

a low voltage power switchgear apparatus having:

a) a first current sensor for monitoring source bus current;

b) a plurality of second current sensors for monitoring current of each of the plurality of feeder circuits;

c) a comparator for comparing the source bus current to a sum of the feeder circuits current and outputting a first arcing fault detection signal indicative of a presence of arcing fault currents; and d) an arc diverter for arresting arcing fault currents by the grounding of the source bus, the arc diverter being responsive to the first arcing fault detection signal.

2. The arcing fault protection system of claim 1, further comprising an optical sensor for use in the production of a second arcing fault detection signal.

3. The arcing fault protection system of claim 2, further comprising means for AND'ing the first arcing fault signal and the second arcing fault detection signal for producing an arc diverter activation signal.

4. The arcing fault protection system of claim 1, further comprising a plurality of optical sensors for monitoring the feeder circuits for the presence of arcing and outputting a second arcing fault detection signal indicative of a presence of arcing fault currents.

5. An arcing fault protection system for a switchgear enclosure accommodating a plurality of feeder circuits, each of the feeder circuits being electrically connected to a source bus and carrying an electric current through the switchgear enclosure toward one or more loads downstream of the switchgear enclosure, the source bus being connected to a power source for carrying current from the power source to the feeder circuits, the switchgear enclosure including a plurality of compartments for housing electrical components associated with the feeder circuits, the arcing fault protection system comprising:

a low voltage open air switching power switchgear apparatus having a) a first current sensor for monitoring source bus current;

b) a plurality of second current sensors for monitoring current of each of the plurality of feeder circuits;

c) a comparator for comparing the source bus current to a sum of the feeder circuits current and outputting a first arcing fault detection signal indicative of a presence of arcing fault currents;

d) an optical sensor in the compartment of each feeder circuit for monitoring the feeder circuits for the presence of arcing and outputting a second arcing fault detection signal indicative of a presence of arcing fault currents;

e) a means for AND'ing the first arcing fault signal detection and the second arcing fault detection signal for producing an arc diverter activation signal; and f) an arc diverter responsive to the arc diverter activation signal for arresting arcing fault currents in the switchgear enclosure by shorting the source bus current.

6. The arcing fault protection system of claim 1 wherein said low voltage power switchgear apparatus uses open air switching.

* * * * *